United States Patent [19]

Thacker

[11] Patent Number: 4,521,988
[45] Date of Patent: Jun. 11, 1985

[54] SELF ALIGNING CROP SPRAYING APPARATUS

[76] Inventor: Gary W. Thacker, 4450 W. 8th St., Yuma, Ariz. 85364

[21] Appl. No.: 424,528

[22] Filed: Sep. 27, 1982

Related U.S. Application Data

[63] Continuation-in-part of Ser. No. 347,892, Feb. 11, 1982, abandoned.

[51] Int. Cl.³ ............................................. A01C 23/02
[52] U.S. Cl. ..................................................... 47/1.7
[58] Field of Search .......................... 239/172, 175, 77; 111/6; 47/1.5, 1.7, 1.44

[56] References Cited

U.S. PATENT DOCUMENTS

| | | | |
|---|---|---|---|
| 559,042 | 4/1896 | Potter | 47/1.7 X |
| 3,147,568 | 9/1964 | Inhofer | 47/1.7 |
| 3,194,193 | 7/1965 | Walters | 111/6 |
| 3,435,785 | 4/1969 | Harbolt | 111/6 |
| 3,785,564 | 1/1974 | Baldocchi | 47/1.7 X |
| 4,237,681 | 12/1980 | Zantzinger | 56/13.6 X |

FOREIGN PATENT DOCUMENTS 459155  10/1913  France ................................ 47/1.7

Primary Examiner—Robert A. Hafer
Assistant Examiner—Danton DeMille
Attorney, Agent, or Firm—J. Michael McClanahan

[57] ABSTRACT

Self aligning sled apparatus for spraying herbicide to the ground surface of the top of the crop row and under the low growing foliage of row crops. Alignment of the plurality of shield sled apparatus is accomplished by the trunks of the crop plants guiding the shield sleds spaning the furrow between rows. Each of the plurality of shield sleds is attached by parallel linkages to a horizontal tool bar secured to the self-propelled sprayer or tractor. The connecting parallel linkages allow each sled to move vertically, horizontally, and rotationally as needed independent of the tractor and of the other shield sleds. As the apparatus moves forward, shields affixed to the shield sleds engage the low crop foliage and lift it upwards in order that spraying mechanism near the rear of each shield sled may apply herbicide to the ground and weeds under the crop foliage. At opposite sides of the plurality of shield sleds are provided a modified shield sled with one or more spring tensioned pivotable arms engaging adjacent plant rows in order to urge more complete engagement and raising of the leaves of the plants on the affected sides of each row.

16 Claims, 11 Drawing Figures

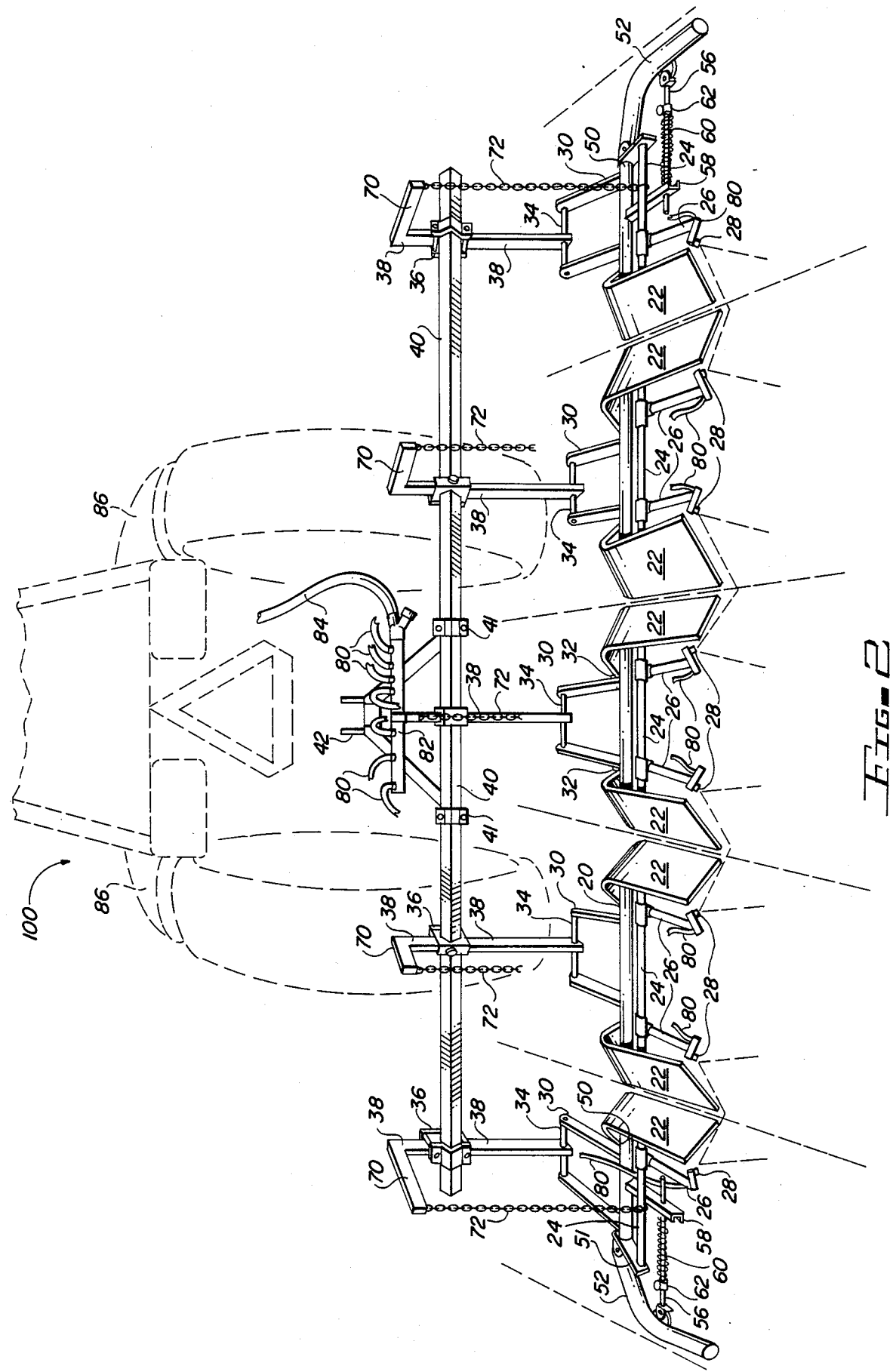

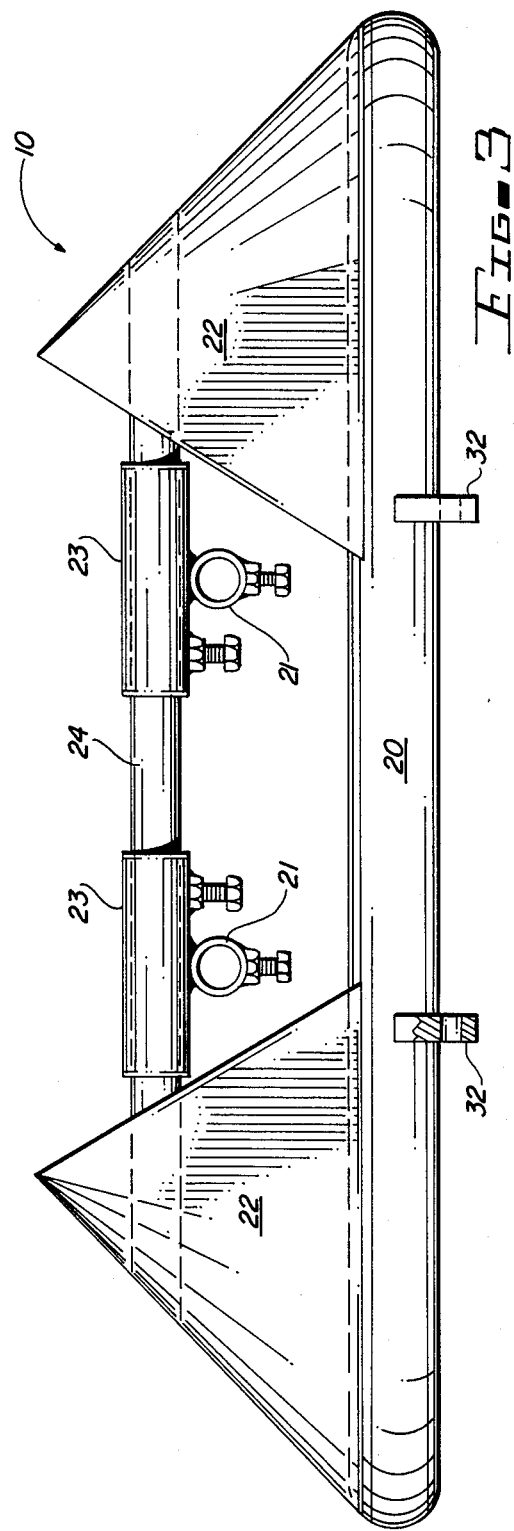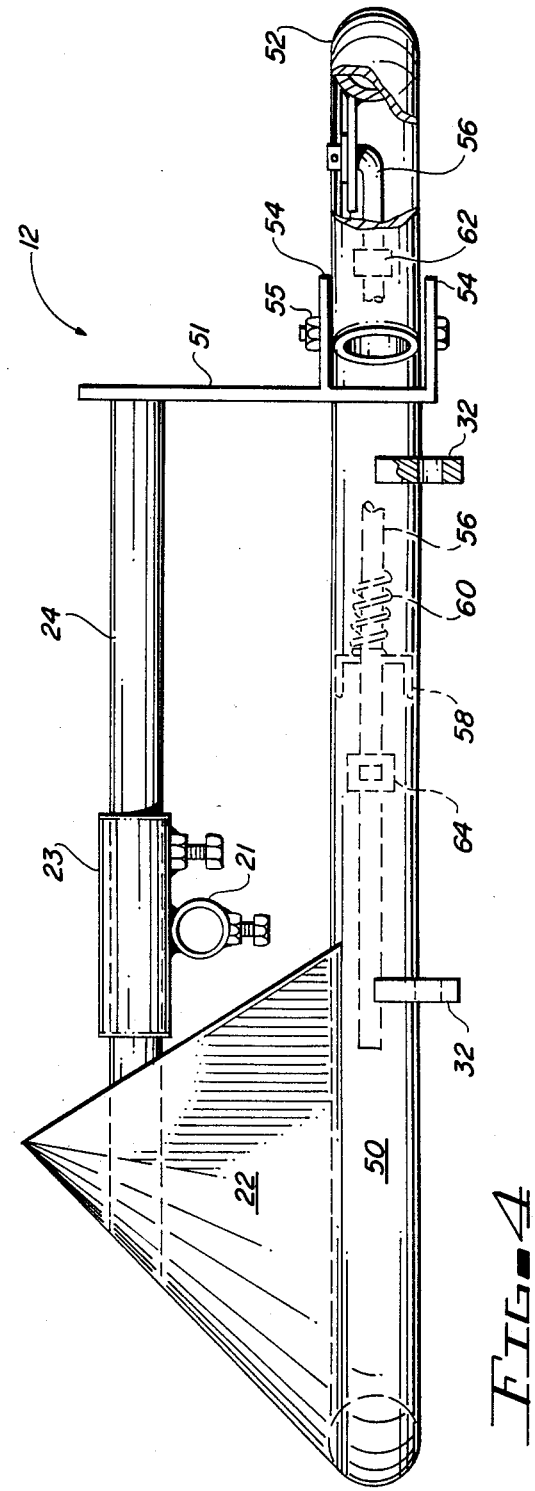

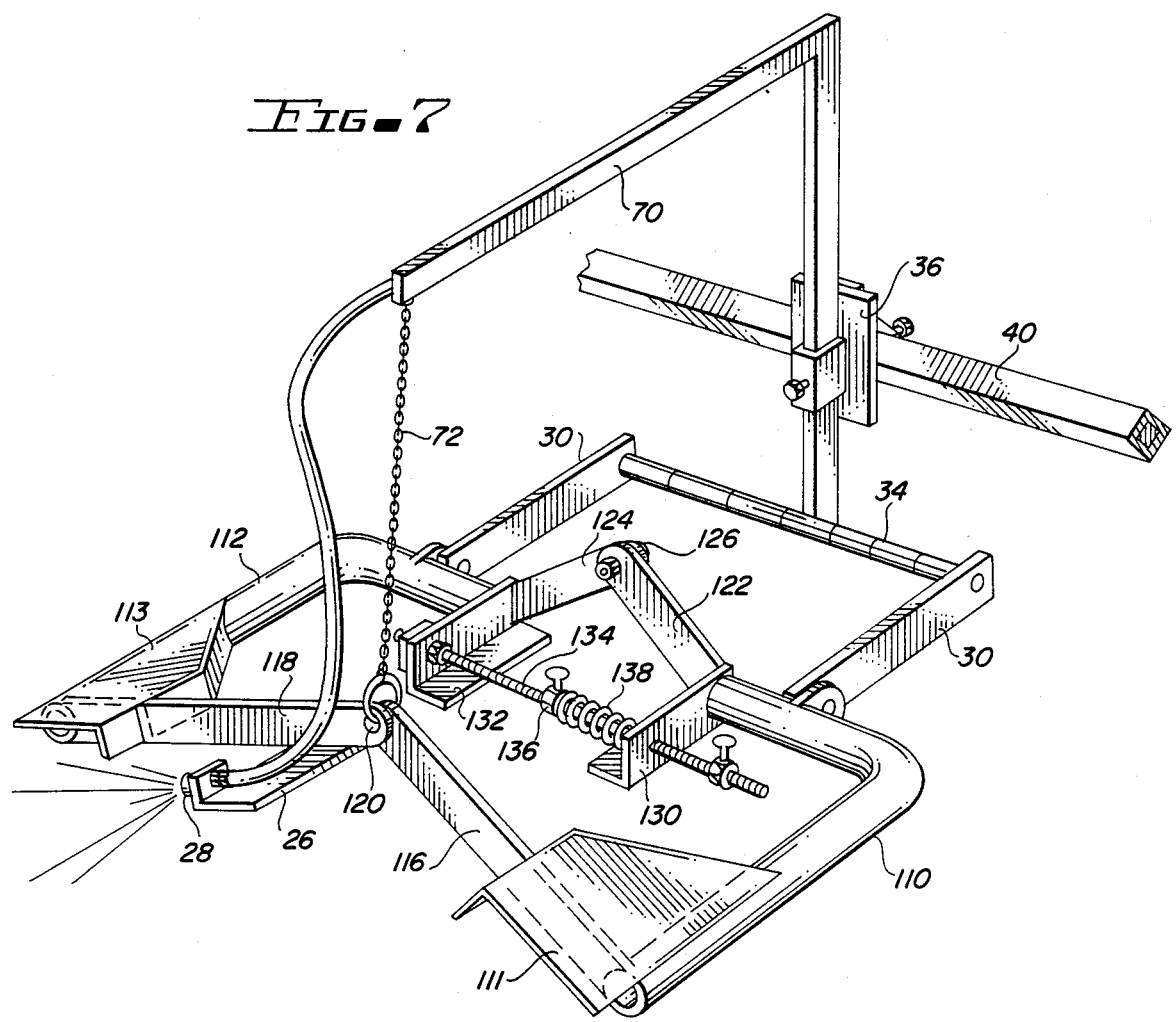
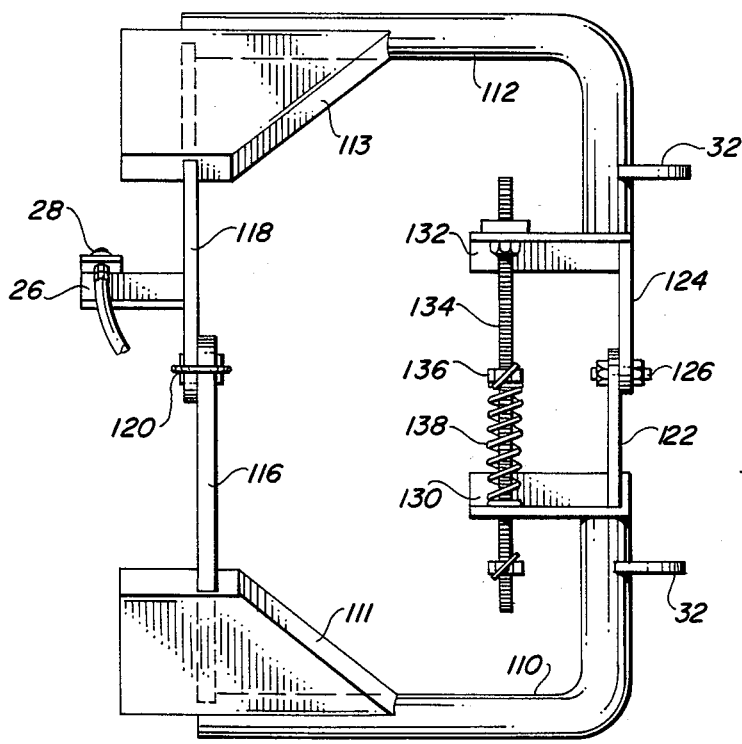

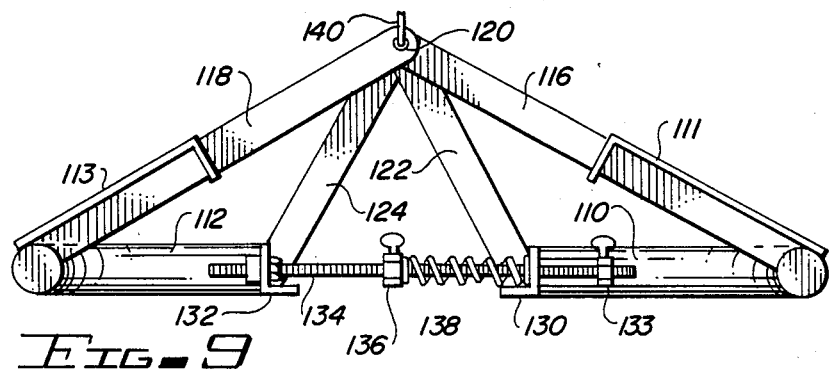
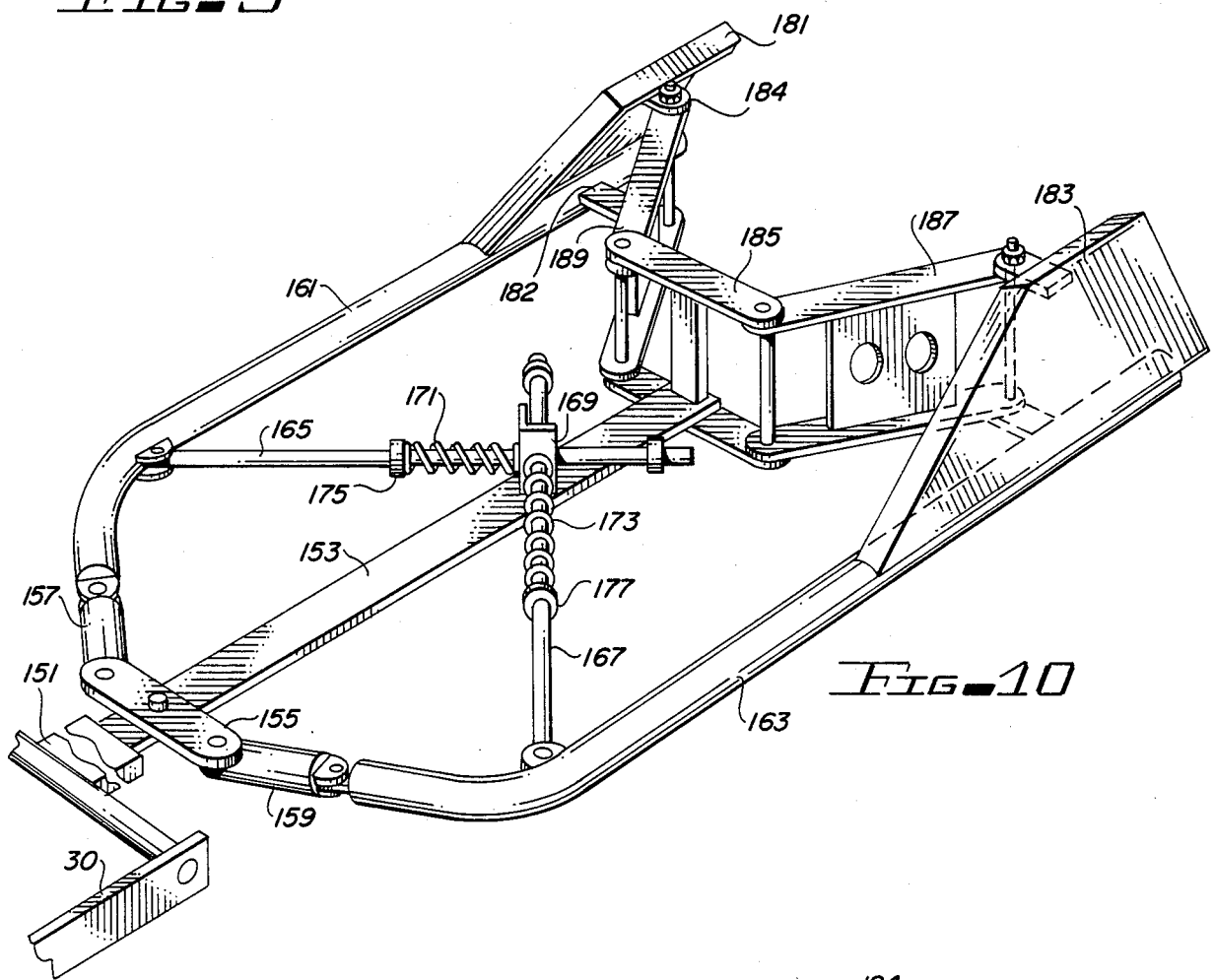
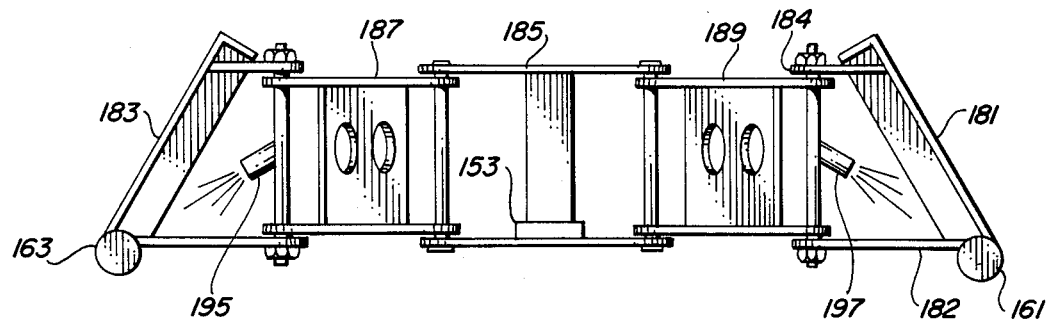

SELF ALIGNING CROP SPRAYING APPARATUS

This is a continuation-in-part of U.S. application Ser. No. 347,892 filed Feb. 11, 1982, now abandoned.

BACKGROUND OF THE INVENTION

Cotton and other similar plant growers have difficulty controlling weeds in or near the rows of the plants. Typically, the crop is planted in elongated rows having a depressed furrow therebetween. The traditional hand hoeing of weeds has become expensive and is often not effective. Some control of weeds in or near the rows may be achieved by using a cultivator to throw soil up and onto the row and thereby bury small weeds, however, large or hardy weeds are not eradicated by such "dirting".

Growers have also used "liquid hoes" or "chemical hoes" to destroy weeds growing in the row. A liquid hoe consists of a spray nozzle on each side of the row of plants, the nozzle spraying herbicide upon the top of the row at the weeds and soil beneath the crop foliage. Properly done, the spray streams pass beneath the plant foliage and slightly overlap each other at the center of the crop row. If the herbicide used will also damage the crop, care must be taken not to spray the crop foliage. A liquid hoe application should result with all of the soil within four to six inches of the row having been sprayed with herbicide with little or no damage to the crop.

Shields are used with the liquid hoes to protect the crop from herbicide damage by lifting and/or pushing crop foliage away from the spray stream as the apparatus moves forward. The shield also provides protection by keeping the spray mist from drifting onto the crop. Shields can increase the efficiency of a liquid hoe by lifting low crop foliage so that the spray stream can contact soil and weeds which would otherwise be missed.

However, lack of precision alignment of the herbicide spraying apparatus to the crop row has been the major problem with liquid hoes. Misalignment of the spraying mechanism results in crop damage from the herbicide contacting the crop, or from the apparatus itself tearing into the crop, damaging the crop and missing the weeds to which the spray is directed. Because the spray nozzles and shields are mounted in a fixed orientation on the tool bar held by the tractor or self-propelled sprayer, the operator must precisely guide the apparatus along the rows and regulate the height of the apparatus.

There have been devices guiding the spraying apparatus by sensing the bottom of the furrow and/or the slope of the bed upon which the crop row is planted. However, problems readily arise in that the furrows of a field often vary in depth, size, shape, and symmetry. Thus an apparatus which aligns itself by sensing the furrow can not do a precise job in a field with non-uniform furrows and beds. In addition, large crop plants make the spray application by present liquid hoes even more difficult because the operator can not see under the crop foliage.

One other problem which readily presents itself to apparatus sensing the furrow or the sides of the crop row bed is that on opposite sides of each group of crop row beds and furrows is what is known as the "guess-row". The reason for this is that it is not possible nor economical to plant all of the seeds in rows in a field with an exact distance separation. For example, a tractor will pull a four row crop planter across the field. The distance between each of the four seed openers on the planter are fixed at the desired row spacing by the machinery. Thus the row spacing between each row of crop plants is fixed for four rows. However, when the operator turns the planter around at the end of the field and commences the next pass of planting the seeds, the distance between the last row of planted seeds and the adjacent first row of the next pass is not fixed and in fact, will vary along the row. The operator will achieve some measure of ability in crop row spacing, however, it is common that the row spacing between two planter passes may vary along the rows as much as plus or minus 10% of the desired row spacing. Growers refer to this variable distance as the "guess-row".

SUMMARY OF THE INVENTION

In accordance with the present invention, means are provided for self-aligning crop spraying apparatus to align itself to the crop row by sensing the actual trunks of the cotton or other crop plants. The apparatus consists of a shield sled slightly narrower than the row spacing of the crop being sprayed. The shield sled spans the distance between the two rows of plants and slides upon the soil on the peaks of the beds holding the plants, the shield sled passing closely to the trunk of the cotton or other crop plant. The shield sled is sufficiently streamlined to be guided by the trunks of the crop plants as it moves forward. Means are provided to allow the sled to move vertically and horizontally, and as needed, rotationally, independent of the tractor and tool bar to which the shield sleds are connected, as well as independently of other shield sleds in an embodiment employing a plurality of shield sleds.

It has been determined that with plants, and especially cotton plants, having a density of 3 to 4 plants per foot of row with trunks of the plants at least a quarter inch in diameter, and at the time when the trunks are turning from succulent to woody, are sufficiently strong enough to provide the horizontal alignment to a sled. In still higher plant populations, the individual plants may be smaller and still perform the guidance to the sleds as necessary. It has been found that this stage of growth is usually achieved by the time, in the case of cotton, when the crop is approximately three months old.

More specifically, the shield sled comprises a u-shaped pipe in a horizontal plane, with the convex curve of the "U" oriented in the forward direction, together with a pair of metal shields rising at a 45° angle upwardly and inwardly from the arms of the "U", each shield extending in the rearward direction beyond the end of the arm of the "U" and in the front direction, continuing forward and encompassing the 90° bend of the "U". As the shield sled slides forward proximate each side of the plant row, the plant's foliage, i.e., lower leaves and branches, are engaged by the rising shields and thereby lifted.

Proximate the tail end of the shield sled and inside the "U" are a pair of herbicide spraying nozzles which are positioned to spray the ground along the peak of the bed at the time when the shields are holding up the plant's foliage. A herbicide or other mixture to be sprayed is sprayed from a point where the u-shaped bar terminates, but the shield continues, such that the plant's foliage is being held up by the shields when the spraying takes place and, in the circumstances of a mispositioned spray nozzle, the shield's underside will receive the spray rather than the plant.

It is anticipated that a plurality of shield sleds will be utilized in order that both sides of the row containing the crop plant will be sprayed, inasmuch as one shield sled will only spray the adjacent sides of two rows.

In addition, on the opposite sides of the shield sleds are modified shield sleds, the modified shield sleds having an outwardly pivotable spring-loaded swing-arm adapted to engage the trunks of the crop plant of the next adjacent row, in most cases, the "guess-row". The modified shield sled comprises an L-shaped pipe holding a shield placed along the long arm and around the 90° bend, and at the end of the short end is provided means for the pivotable arm to pivot from. The L-shaped pipe and pivotal arm together resemble the u-shaped pipe previously described. The functional difference is that with the modified shield sled, the arms of the "U" can close together or spread apart to engage the variable row spacing between two planter passes. The shield is adapted to engage the crop row between the modified shield sled and the plurality of shield sleds. By maintaining tension upon the pivotal arm against the outside "guess-row" of plant trunks, the shield is continually urged up against the inside row of crop trunks. The modified shield sled also contains the spraying apparatus to spray the bed of the inside plant row.

In another embodiment, the modified shield sled has the pipes on both sides which engage the plant stems of each side of the guess-row spring biased about a central pivotal axis in order that each side, independently of the other may seek the plant stems. The shield then carried on each pipe raise the plant leaves for complete spraying of the rows.

All shield sleds and modified shield sleds are connected to the tractor or self-propelled sprayer by means of parallel linkages connected between the shield sleds and a cross-bar attached to the tractor's hydraulically operated lift support. By utilization of the parallel linkages in a configuration where shanks of bolts passing through holes in the parallel linkages are substantially smaller than the holes, vertical, horizontal, and to some extent, rotational movement of the shield sleds, independent of each other and of the tractor, is afforded in order that the shield sleds may follow the crop plants.

Accordingly, it is an object of the subject invention to provide apparatus to lift plant foliage for spraying herbicide under the plants where the spraying mechanism is always directly positioned.

It is another object of the subject invention to provice means whereby sleds adapted to lift the foliage of row crop plants attains proximity to the crop plants by utilizing the plant trunks for guidance.

Other objects of the invention will impart be obvious and will in part appear hereinafter. The invention accordingly comprises the apparatus possessing the construction, combination of elements, and arrangement of parts which are exemplified in the following detailed disclosure, and the scope of the application of which will be indicated in the claims.

DETAILED DESCRIPTION OF THE DRAWINGS

For further understanding of the nature and objects of the present invention, reference should be had to the following detailed description taken in connection with the accompanying drawings wherein:

FIG. 2 is a perspective view from the rear of the subject invention;

FIG. 3 is a front elevational view of a shield sled;

FIG. 4 is a front elevational view of a modified shield sled;

FIG. 7 is a perspective view of an alternate embodiment of the invention;

FIG. 8 is a top view of the alternate embodiment of FIG. 7;

FIG. 9 is a rear view of the alternate embodiment of FIG. 7;

FIG. 10 is a perspective view of another alternate embodiment; and

FIG. 11 is a rear view of the alternate embodiment of FIG. 10.

In the various views, like index numbers refer to like elements.

DETAILED DESCRIPTION OF THE PREFERRED EMBODIMENT

Figure 1:
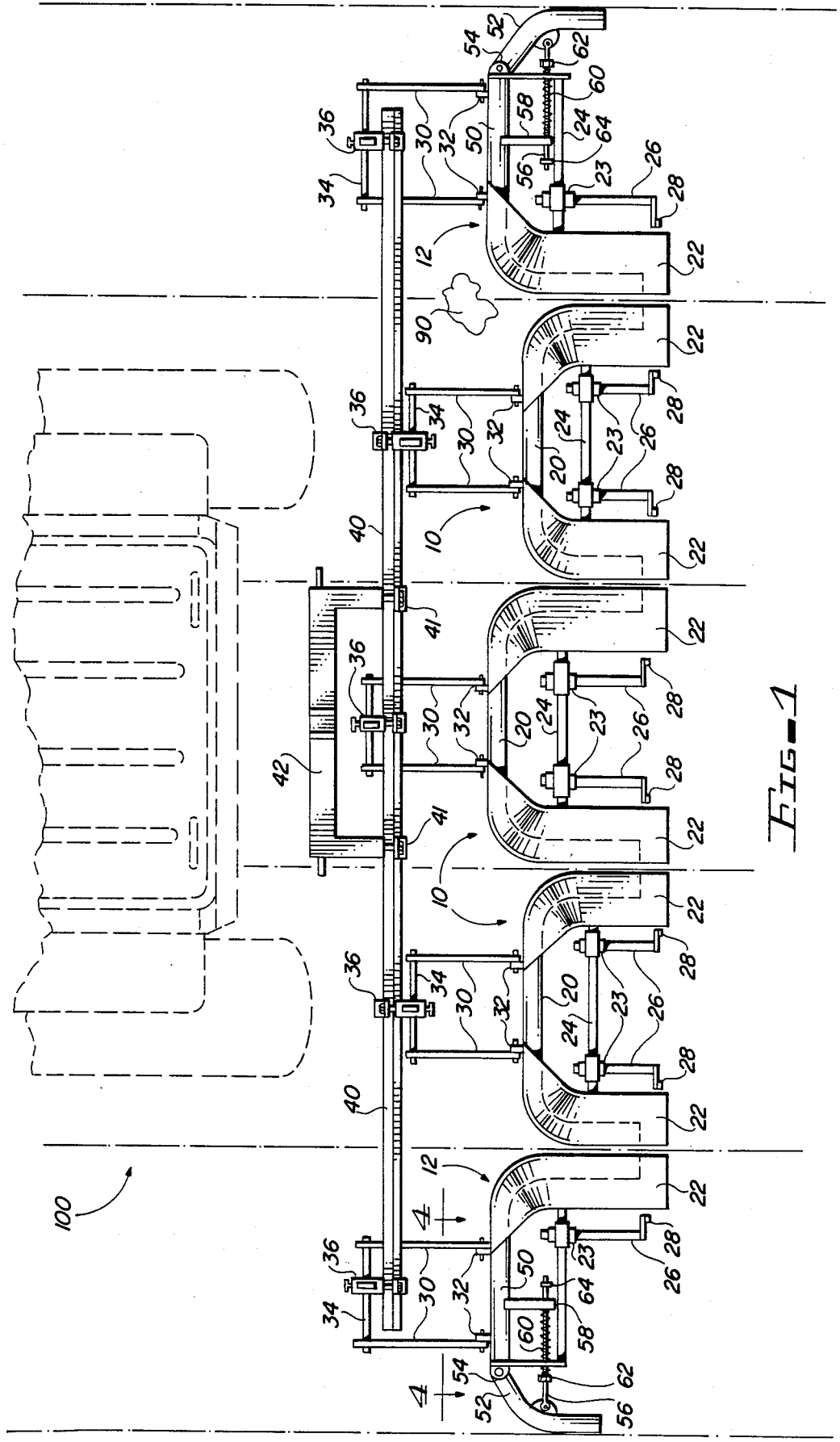
FIG. 1 is a top view of the subject invention.

Referring now to FIG. 1, a detailed top view of the subject invention is shown. For ease of illustration, it has been assumed that the rows of crop plants were planted by a four-row planter where four of the six rows shown by the dotted parallel lines are spaced at a fixed and known spacing with the additional rows on either end being the "guess-rows", whose spacing to the outside rows of the four-rows may vary plus or minus 10%. As a result, the invention shown has the requisite number of appropriate shield sleds.

Firstly, the subject inventive apparatus comprises three centrally located shield sleds 10 and two modified shield sleds 12 on opposite sides of the three central shield sleds. As is seen in FIG. 1, all shield sleds are in placement alternately staggered so that one sled will proceed, or alternately, follow its neighbor. This is accomplished very simply as will be explained later as will the reasons for such staggering. The shield sleds then are modified in their tail-end section so that they present a straight line trailing edge as the tractor, self propelled sprayer, or other prime mover moves forward with the subject invention being pulled by the prime mover.

Each of the three central shield sleds 10 is primarily constructed of a u-shaped pipe 20 which places the convex portion of the "U" in the forward going direction. The sides of the u-shaped pipe 20, as shown in FIG. 1, are covered by shaped metal shield 22 which rises upward out of FIG. 1 pyramid-like in the front to the point where the obtuse angle is shown. This shield 22 joins to the convex portion of u-shaped pipe 20 in a 90° turn and then receeds parallel to the rear where it terminates. Nominally, u-shaped pipe 20 and metal-shaped shield 22 are joined by welding whereby the combination is strengthened and the shields 22 may then perform their function of lifting the low-lying leaves of the row plants. U-shaped pipe 20 does not run the whole length of shaped shield 22, but in fact terminates just short of spray nozzle 28 as shown in dotted form in FIG. 1.

Attached between the upper portions of opposite shaped shields 22 is cross pipe 24 which has, proximate opposite ends, sleeves 23 to which are also connected nozzle mounts 26 at which end are attached spray nozzles 28. As is obvious, the herbicide or other liquid which is to be sprayed upon the ground connects by hose lines (not shown) to spray nozzles 28.

Attached centrally to the forward portion of u-shaped pipe 20 is parallel linkage 30, metal bars, which allow the movement, horizontally and vertically, of the shield sleds 10 and modified shield sleds 12. Parallel linkages 30 are mechanically attached to u-shaped pipes 20 by means of trunions 32, metal tabs welded to the u-shaped pipes 20 convex curve portion, and having a hole drilled cross-wise therethrough which aligns with a larger hole in parallel linkage 30. A bolt is fastened to trunion 32 by means of a fastening nut on each side of trunion 32, with the shank of the bolt extending through the hole in parallel linkage 30. In this manner, vertical and horizontal freedom of the shield sleds relative to the parallel linkage is afforded. Moving forward, parallel linkage 30 from the shield sleds connects with a short piece of pipe 34 by means of bolts passing through holes in parallel linkages 30 to engage a nut which has been welded on the end of the pipe 34. Here again, vertical and horizontal freedom of the shield sleds is provided between parallel linkages 30 relative to short pipe 34 by means of undersized bolt shanks.

Welded at a point central to short pipe 34 is tool shank 38, the rectangular cross-sectioned top of which is shown emerging centrally to clamp 36. Nominally, tool shank 38 is in length between two and three feet and is height adjustable by means of a set screw shown penetrating clamp 36. Clamp 36, in turn, connects with transverse tool bar 40 which in the preferred embodiment is a diamond shaped bar of sufficient size and strength to provide adequate means of support for all the connecting shield sleds. Continuing on, tool bar 40 is attached to the tractor or other prime mover 100 by means of a hydraulically operated support 42 attached to prime mover 100 with the terminus of each support arm attached by clamp to tool bar 40.

Moving now to the outside two mirrow image modified shield sleds 12, there is similarity of construction in at least one/half of the modified shield sled as there is in one/half of the shield sled 10. Firstly, L-shaped pipe 50 which joins forward oriented trunions 32 to parallel linkages 30, has like metal-shaped shield 22 attached to one leg, that leg proximate the centrally located shield sleds 10. Attached to the other end of L-shaped pipe 50 is spring-loaded pivotal arm 52, arm 52 attached by means of trunion 54 connected at the circular ends of L-shaped pipe 50. Through this trunion 54 is drilled a hole to align with a similarily drilled hole in spring-loaded arm 52, and through the hole resides a bolt capped with a nut. Thus, the pivotal action of arms 52 is provided. Attached to arm 52 near its proximate central located bend is control rod 56, pivotally connected with spring-loaded pivotal arm 52 by turning up control rod 56 and penetrating a hole through a welded-on trunion. The control rod 56 is then terminated with a cotter pin. Attached at right angles to L-shaped pipe 50 is a short piece of u-channel stock termed a standard 58 through which a hole is drilled to slidably accomodate the opposite end of control rod 56. Control rod 56 has mounted around its periphery spring 60 which engages adjustable set collar 62 at its end nearest spring-loaded pivotal arm 52. The hole drilled in standard 58 is sufficiently large enough to pass control rod 56, but not spring 60. Thus, by adjustment of movable set collar 62, a spring tension may be set up to impose upon spring-loaded pivotal arm 52 an always present urge to pivot outwards from the central portion of the invention. The amount of tension upon spring-loaded pivotal arm 52, and the distance that arm 52 may pivot are controlled by the combination of the placement of adjustable set collar 62, standard 58, spring 60, and finally, a collar 64 proximate the interiorly pointed end of control rod 56.

In summary, vertical movement of the shield sleds 10 and 12 is afforded through the use of parallel linkages 30. Because of the slackness in the holes in the parallel linkages and the sizes of the bolts which run through each end of each parallel linkage, horizontal or side movement of a limited amount is also accorded. In addition, because each arm of parallel linkages 30 may operate independently of its mate, only one side of the sled shields may be raised or lowered in accordance with what it may be called upon to do. It is expected that the holes through the parallel linkages 30 may be as large as one-sixteenth inch greater than the shank of the bolts which connect the parallel linkages firstly to the trunion 32 and secondly to the short pipe member 34.

Referring now to FIG. 2, a perspective view of the inventive apparatus is shown as viewed from the rear of the prime mover 100, be it a tractor or self propelled sprayer. The embodiment shown in FIG. 2 differs from that shown in FIG. 1 by the addition of the horizontal cross member 70 which is set at right angles to tool shank 38, the rectangular cross-section of which was seen held in clamp 36 of FIG. 1. For clarity, it was removed from FIG. 1. To the distal end of horizontal cross member 70 is attached chain 72 which in turn attaches to cross pipe 24 structurally connected to the sled shields 22. The purpose of the horizontal cross member 70, and the chain 72 connecting with cross pipe 24 is to raise the back portion of each of the sleds when the tool bar 40, which is attached to hydraulic operated lift 42 on the prime mover, is raised as the prime mover changes rows or makes turns or the like and it is not desired that the shield sleds should engage the ground.

Continuing on, and describing the apparatus for which the top view is shown in FIG. 1, prime mover 100 hydraulic operated support 42 connects with tool bar 40 through means of clamps 41 in order to raise and lower as desired tool bar 40 and the connecting inventive apparatus. Each of the shield sleds 10 and 12 are connected by their respective clamps 36 to tool bar 40. As is noted, the alternate staggering of the shield sleds 10 and 12 is accomplished merely by alternately changing the orientation of the clamps 36 from their connection on one side or the other of tool bar 40. Dropping vertically from clamp 36 is the tool shank 38 which joins centrally to short pipe 34 which in turn, has located at each end, parallel linkages 30. As indicated earlier, parallel linkages 30 has holes at each end which receives the shank of bolts screwed into a nut welded to short pipe 34, which bolt shank is substantially smaller in diameter than the holes in the parallel linkage in order that horizontal and slight rotational movement of the shield sleds is afforded. At the opposite end of parallel linkages 30 are trunions 32 attached to either u-shaped pipe 20 or L-shaped pipe 50, depending on which sled is viewed, either the three central shield sleds 10 or the modified shield sled 12 at opposite ends of the arrangement.

Connective to the central shield sleds 10 u-shaped pipe 20 are the metal shaped shields 22 which rise up from their welded connected point with the u-shaped pipes 20 in an up-sloped configuration. The forward end of the metal shaped shield 22 is bent around the u-shaped piece 20 in a compound cruve so that at all points along the shield 22 the surface is continually rising in order that the leaves of the plant, from the point of initial engagement, will be lifted up. On the two modified shield sleds 12 at opposite ends, metal shaped shield 22 is only on the interior side of the L-shaped pipe 50. On the opposite ends of each L-shaped pipe 50 is spring-loaded pivotal arm 52, pivotal at the termination of L-shaped pipe 50, spring-loaded pivotal arm 52 connecting with control rod 56 in a spring-loaded manner through spring 60 to metal standard 58. The adjustable set collar 62 is shown with the set screw visible and the spring 60 intermediate the adjustable set collar 62 and the standard 58.

Interiorly to the central portion of the u-shaped pipe 20 and L-shaped 50 is the spraying mechanism cross pipe 24, which pipe 24 is welded to opposite sides of sled shields 22 on sleds 10, and to the sole shield 22 on the modified shield sled 12, the other side of cross pipe 24 on the modified shield sleds 12 attached to support member 51 attached at the end of L-shaped pipe 50. Emitting perpendicular to cross pipe 24 are the spray nozzle assemblies consisting of nozzle mounts 26 and spray nozzle 28. Shown in FIG. 2 is the emission of the herbicide spray, the emission following a generally triangular shape pattern commencing at the spray nozzle 28. As can be seen from the spray pattern, the sprays from opposite spray nozzles 28 are adjusted to join at a generally central area which is in the space between opposite metal shaped shields 22. This space, of course, is the space through which the crop plant trunks pass as the apparatus moves along the rows. The rows of the crop plant trunks are represented by parallel dotted lines in the FIG. 2.

As the inventive apparatus moves through the field, the trunks of the plants, normally between one/quarter inch and one/half inch in diameter, will guide each shield sled, the shield sled being sufficiently easily movable horizontally that the plant trunks have sufficient strength to limit horizontal movement of the shield sled. The shield sled will generally move in a straight line following the prime mover, however, there will be some movement side to side between rows of trunks. In the normal usage, a total sidewise movement of one/half inch is expected. It is anticipated that there will normally be about one inch spacing between adjacent shield sleds 10 and 12 as the device moves through the fields. Thus if the crop plant trunk is one/half inch in diameter, the clearance between the shield sled and the plant trunks on both sides will total one/half inch. To clarify, the clearance may be one/half inch on one side of the shield sled and zero on the other side, or any combination of clearances that total one/half inch.

As has been indicated in the background materials, the guess row may differ in width by plus or minus 10%. The purpose then of the spring-loaded pivotal arm 52 is to continually engage the trunk of the adjacent guess row crop plants and thereby urge the L-shaped pipe 50 on the opposite side of the modified shield sled 12 against the trunks of the crop plants row adjacent to the guess row. It is obvious that spring 60, together with the tension set on the spring by movable set collar 62, should be such that the guess row trunk plant is able to engage and immediately flex pivotal spring loaded arm 52 until the tension which would then be applied through control rod 56 to metal standard 58 has moved the L-shaped pipe 50 against the inside crop plant row trunk.

Shown in FIG. 2 is the multiple flexible pipe and tubing 80 used to convey the herbicide or other spray to the spraying mechanisms from the herbicide manifold 82, the herbicide manifold 82 receiving its supply of herbicide from carried storage tanks 86 through means of connective piping 84.

The operator then, through manipulation of valves in the connective piping 84, can determine when the herbicide is to be applied to the ground immediately adjacent the crop row plants.

If one is referred to FIG. 1 again, the situation of a rock in the row represented by the number 90 is shown in the right handed portion of the Figure. Whenever this happens, the u-shaped or L-shaped pipe bottom portion of the shield sled in the lead, shield sled on the right, will first engage the rock causing it to either move off the row or fully into the path of the following adjacent shield sled. The following adjacent shield sled will then rush the rock down into the furrow between the rows or will ride up over the rock, lifting the sled generally upward with little side movement. This will tend to merely lift the plant leaves upward a bit and will cause some small amount of overlapping of spray. Immediately after the sled has cleared the rock, it will proceed to return to the ground upon which the lower portion of the u-shaped pipe 20 or L-shaped pipe 50 slides.

Referring now to FIG. 3, a front elevational view of shield sled 10 is detailed. As indicated above, pyramidal shaped metal shield 22 is shown on both sides of the 90° turns of the u-shaped pipe 20. These metal shaped shields 22 extend backward into the paper along the outside most edge shown in the drawing. The metal shaped shield 22 is attached to the top part of u-shaped pipe 20 nominally by welding. In the forward portion of u-shaped pipe 20 are the two centrally spaced trunions 32 shown with a dotted line for the holes by which the bolts attach the parallel linkages. Attached across from the two metal shaped shields 22 is cross pipe 24 which attaches, in the preferred embodiment, by welding to the shields 22 opposite each other. Located on cross bar 24 are a pair of sleeves 23, each adapted to be held in place by a set screw. In turn, these sleeves have a second sleeve 21 attached transversely thereto, the second sleeve 21 shown immediately below the sleeve 23 surrounding cross pipe 24. The second sleeve 21, also possessing a set screw, is designed to hold in place the nozzle mounts 26 and their attached spray nozzles 28 (FIGS. 1 and 2). As can be seen, by manipulation and adjustment of the sleeves upom cross bar 24, the horizontal and vertical placement of the spray nozzle may be adjusted to spray the ground immediately adjacent to the cotton or other plant trunks.

Now referring to FIG. 4, a front elevational view of modified shied sled 12 is detailed. Firstly beginning at the left, the metal shaped shield 22 is shown riding immediately above the L-shaped pipe 50, metal shaped shield 22 attached by means of welding to L-shaped pipe 50. Continuing to the right, trunions 32 are shown located generally central to the overall width of the modified shield sled 12. These trunions, as have been detailed earlier, are also welded to the pipe 50 and have, in dotted form, a hole therethrough to receive the parallel linkages 30 (not shown) holding bolt and nuts.

At the far right hand side of the front elevational view of spring loaded pivotal arm 52, the arm situated pivotally between two trunions 54, the trunions and spring loaded pivotal arm 52 pivotable about nut and bolt 55. Shown in dotted form behind L-shaped pipe 50 and spring loaded pivotal arm 52 is the mechanism for spring loading the spring loaded pivotal arm 52, comprising namely the spring 60, control rod 56, the adjustable set collar 62, the metal standard 58 penetrated by the control rod 56, and the spring loaded pivotal arm 52 stop, namely, collar 64. As can be seen, the pivotal action of the control rod 56 being turned to a 90° angle, penetrating a trunion welded to spring loaded pivotal arm 52, and held in place by means of a cotter pin penetrating control rod 56.

Immediately above L-shaped pipe 50 is cross pipe 24, modified a slight amount from similar cross pipe 24 on the shield sleds 10, but nevertheless attaching to the upper portion of metal shaped shield 22 by, in the preferred embodiment, welding, and attached at its other end to a piece of metal stock, support member 51, which support member 51 is attached at its other end to L-shaped arm 50. Attached proximate the metal shaped shield 22 is sleeve 23 which is held on cross bar 24 by means of a set screw, sleeve 23 also having a second sleeve 21 attached transversely thereto to contain the nozzle mounts 26 and spray nozzle 28 (not shown). This transverse sleeve 21 attached to sleeve 23 additionally has a set screw located therein within which to adjust and set the nozzle mount 26.

Figure 5:
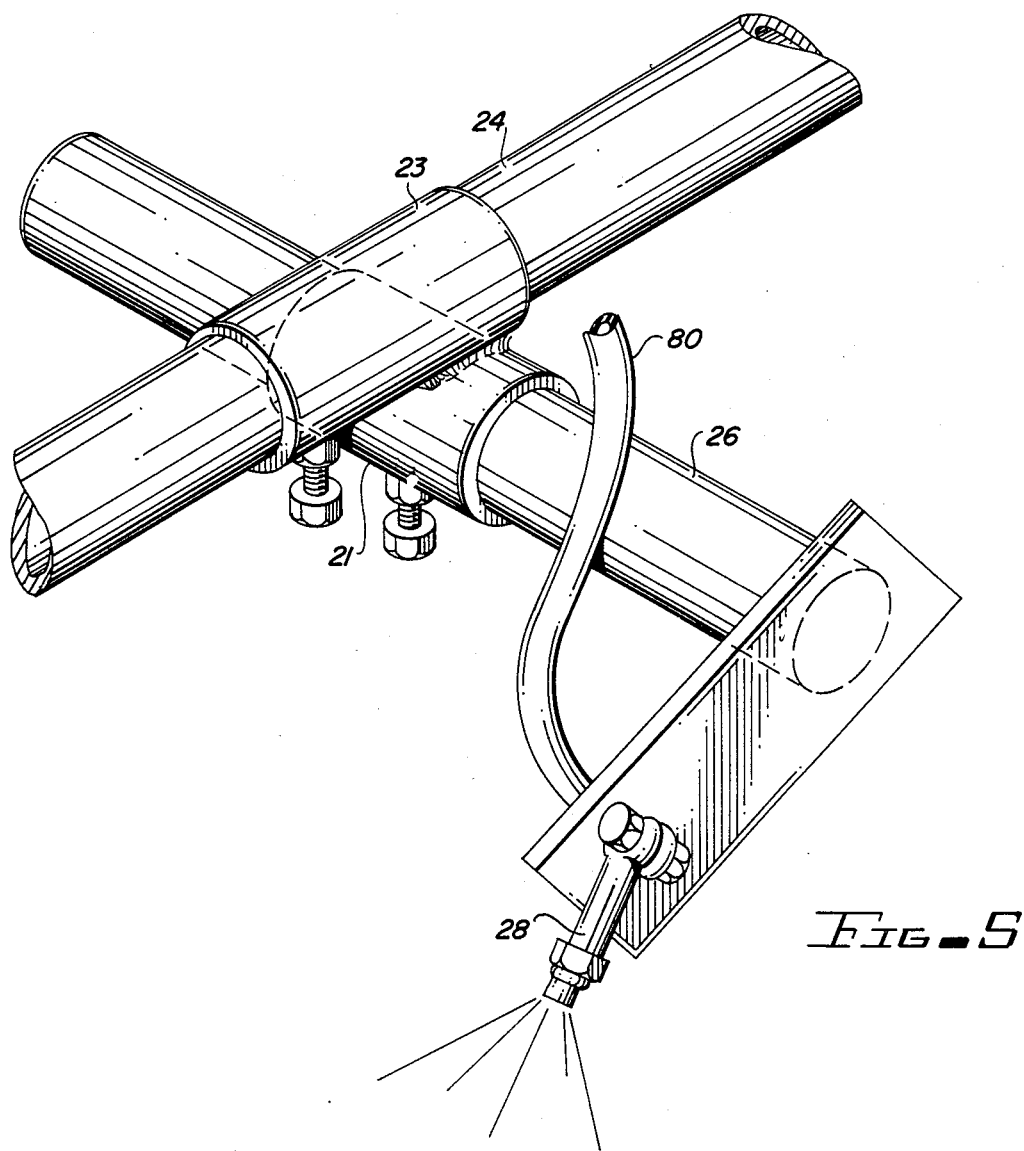
FIG. 5 is a perspective view of the herbicide spraying apparatus.

Referring now to FIG. 5, a perspective view of the herbicide spraying mechanism is detailed. Firstly, sleeve 23 is shown attached to cross bar 24, with sleeve 21 attached transversely thereto. Emerging from sleeve 21 is nozzle mount 26, which has at its terminus thereof, a flat plate to which is attached the spray nozzle 28, a tee jet swivel and nozzle assembly. Attached to nozzle 28 is the herbicide solution hose or connection pipe 80 which in turn attaches to herbicide manifold 82 (FIG. 2).

Figure 6:
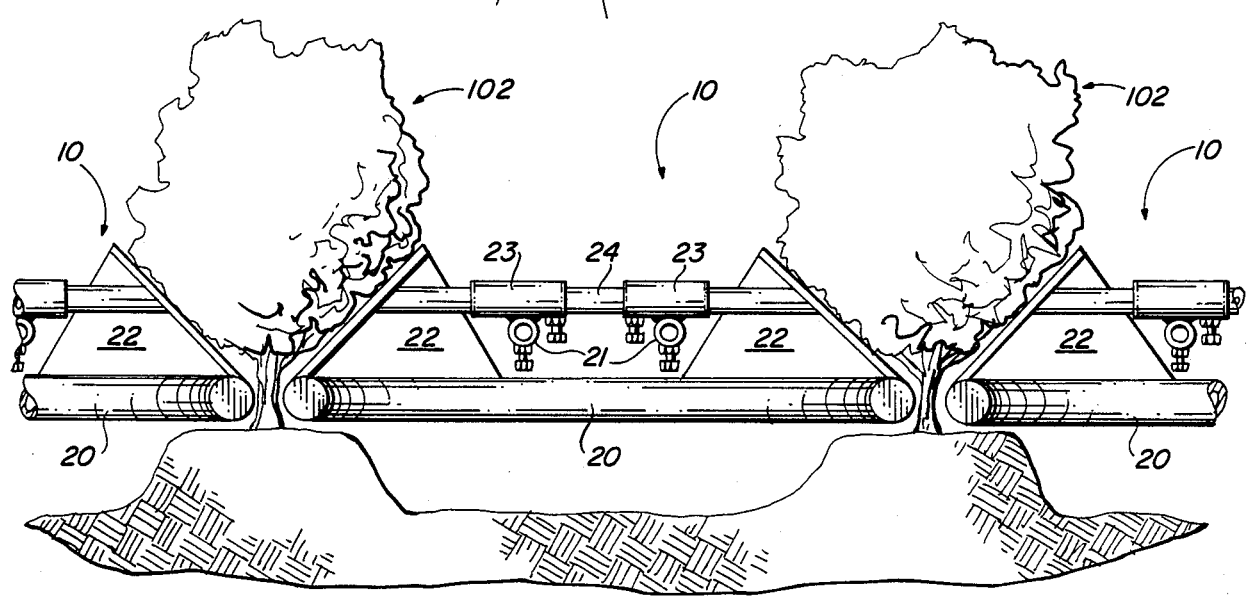
FIG. 6 is a cross-sectional view of a portion of the subject invention in use.

Referring now to FIG. 6, a cross-sectional view of a portion of the subject apparatus in use in a typical crop field is shown. Here are shown the rows of earth which are built up to receive the seed, and from which the plants emerge. As indicated earlier, the seeds are planted mechanically by the planter at a fixed separation, i.e., equal distance between rows. A pair of typical plant trunks 102 are shown, greatly enlarged with respect to the cross-sectional size of the earth row, together with the cross-section of u-shaped pipe 20 and shield 22. As earlier mentioned, the shield sled 10 rides between the rows of plant trunks missing each plant by an average of one/quarter inch. As the shield sled is pulled through the field between the rows of plants, it has sufficient freedom to move between the rows, lifting with the metal shields 22 the plant leaves. Immediately following the terminus of the u-shaped pipe 20, but still having protection of the shield 22 extending beyond the end of u-shaped pipe 20, the spray nozzle 28 (not shown) sprays under the shield 22 and upon the earth immediately below. The shield sleds 10 then are guided side by side as needed by its engaging the plant stalks 102 which, because of the ease by which the sled may be guided, are capable of such guidance.

In the event that the u-shaped pipe should engage a rock in its way, such as shown by rock 90 in FIG. 1, the tendency is for the first sled to hit the rock and thereupon push it sideways which would be off the peak of the bed. Thereafter, if the rock is still sufficiently within the peak of the bed, the second shield sled will either ride up and over the rock or if the rock is sufficiently into the slope of the bed, will push the rock off of the bed and into the concave furrow which separates the rows.

An alternate embodiment of a portion of the subject invention is shown in FIG. 7 in a perspective view of the modified sled of the self-aligning sled apparatus adapted to move in the guess-row situated between the groups of fixed-width rows. Here two opposite L-shaped bars traverse the tops of the rows of the plants, the elongated portion of each bar engaging the plant stems on each side.

Each of the L-shaped bars are pulled along by means of the rectangle shaped linkage 30, the linkage connected to trunions attached at the front facing side of L-shaped bars 110 and 112, the other end of the linkages 30 attached to horizontal pipe 34. In all cases, undersized bolts penetrate holes in each end of linkages 30 in order that the pair of L-shaped bars 110 and 112 have independent and separate freedom of movement, both horizontally and vertically (other than the effect through the spring-biasing means and the pivoting means interconnecting the two L-shaped bars).

Attached at the trailing ends of L-shaped bars 110 and 112 are angled shields 111 and 113, which shields are attached to the top and outside portion of L-shaped bars 110 and 112 respectively, the shields rising at an inwardly directed angle along struts 116 and 118. Both L-shaped bar 110 and shield 111 connect to strut 116, L-shaped bar 110 by welding at the end of strut 116 and to shield 111 by its top folded over edge having strut 116 passing through a hole, and the same for L-shaped bar 112 and shield 113 with respect to strut 118. Struts 116 and 118 then are joined together in a pivoting relationship at their point of crossing, namely through pivot bolt 120.

Similarily, at the forward end of L-shaped bars 110 and 112, forward upwardly directed angle struts 122 and 124 join respectively at the ends of the short section of L-shaped bars 110 and 112 by welding. Again the struts rise to the vertical at an inward angle where they are placed in pivotable relationship at a pivot point by means of bolt 126. Attached at the inside of short arm portions of L-shaped bars 110 and 112 and directed rearward are pieces of angle iron 130 and 132, the upright angle portion of which are penetrated by oppositely drilled holes adapted to receive horizontal rod 134. Rod 134 is fixedly attached to angle iron 132 by means of fastening nuts, and slides through a hole in the upright portion of angle iron 130 on the opposite side. Attached at a selected point on rod 134 is set screw adjustable movable stop 136. Surrounding the shank of rod 134 is tension spring 138 which resides between stop 136 and the upright portion of angle iron 132, the spring so biased by the positioning stop 136 as to always urge the spring against angle iron 132, and thus L-shaped bar 112 away from angle iron 130, and thus L-shaped bar 110. Through this means, both L-shaped bars 110 and 112 are urged against the stems of the plants on each side of the guess-row.

The forward struts 122 and 124, and the rear struts 116 and 118 are so constructed and dimensioned such that the pivotal axis running through pivotal bolt 120 and pivotal bolt 126 are aligned parallel to the L-shaped bars 110 and 112, which are also parallel. This is more clearly shown in FIGS. 8 and 9, top and rear views of the subject apparatus.

Finally, spraying apparatus 26 and nozzle 28 are shown attached to rear strut 118.

Referring now to FIG. 8, a top view of the alternate embodiment is detailed. Here more clearly shown is the means by which the L-shaped bars 110 and 112 are permitted to pivot apart in a parallel fashion and thus adjust to the varying width between the plant stems in the guess-row. Such is accomplished by alignment of the pivot bolts 120 and 126. The tensioning means employing tension spring 138 and rod 134 connecting ultimately each of the L-shaped bars 110 and 112, is also shown in a more clearer view.

To the rear of the modified sled shown in FIG. 8 are the shields 111 and 113 respectively attached to the L-shaped bars, and struts 116 and 118 attached to both L-shaped bars 110 and 112 as well as shields 111 and 113. Again struts 116 and 118 join at their top-most portion in pivotal relationship by means of metal plates attached to each, each metal plate drilled with a hole to receive pivot bolt 120.

At the front ends of L-shaped bars 110 and 112 are attached forward struts 122 and 124 respectively, the struts rising to join together at a pivot point by means of pivot bolt 126. Finally, at the very front portion of the L-shaped bars 110 and 112 are the trunions 32 attached by welding, and for joining to linkages 30 by an undersized shank bolt.

Referring now to FIG. 9, a rear view of the subject apparatus is shown, showing in particular the tensioning apparatus comprising tension spring 138, positioning stop 136, and rod 134 together with the angle irons 132 and 130. The very end of L-shaped bars 110 and 112 are shown together with the forward portion. At the far end of rod 134 is set screw adjustable stop 133, which allows for maximum sidewise movement of L-shaped bars 110 and 112.

Proceeding upward from L-shaped bars 110 and 112 are the rear struts 116 and 118, as well as forward struts 122 and 124 respectively. Further, shields 111 and 113 are shown in attachment to the rear struts 116 and 118, the struts passing through an opening in the shields' bent over upper edge, and to the top of L-shaped bars 110 and 112. Finally rear pivot bolt 120 is shown together with eye 140 consisting of a metal strap having a hole at one end through which pivot bolt 120 passes, and a loop at the other end, eye 140 adapted to be connected to lifting chain 72 (FIG. 7).

Referring now to FIG. 10, an additional alternate embodiment of the modified sled apparatus for traversing the guess-row between the fixed-width rows is shown in a perspective view. As detailed in FIG. 10, shown is the linkage 151 connecting with cross bar 31 and to the parallel linkages 30 and ultimately to the tractor, which connecting linkage is joined to straight elongated bar-type central structure 153 immediately prior to joinder plate 155. Joinder plate 155 attaches to central structure 153 in fixed relationship by means of welding, however, is pivotally connected to outward pointing metal bar-type side pieces 157 and 159 also by means of pivot bolts in order that there be allowed side to side movement of the two side structural pieces 157 and 159, each piece pivotally independent of each other.

Connected to each end of side pieces 157 and 159 are the modified sled plant stem sensing elements, namely elongated side bars 161 and 163 respectively. To the inside of each of the side bars is connected in a pivotal fashion, control rods 165 and 167, the control rods spring biased against the central structure 153 by means of an upright standard 169 attached to central structure 153. Each of the control rods 165 and 167 penetrate oversized openings in adjacent sides of right angle shaped standard 169. The control rods 165 and 167 are spring biased against standard 169 by compression springs 171 and 173 respectively, the springs held in compression by means of movable set collars 175 and 177 situated on the control rods. On the far ends of control rods 165 and 167 are additional movable set collars, so situated to prevent the elongated side bars 161 and 163 from moving apart an excessive distance.

Continuing on, attached to the rearward portion of elongated side bars 161 and 163 are plant shields 181 and 183 respectively, the shields adapted to engage the lower portion of the plant and raise the leaves of the plant on one side of each row. The shields are attached to the top portion of the elongated side bars, rising from such point at an angle directed towards the opposite side. Attached at the end of central structure 153 is I-structure 185 comprising two spaced apart parallel short straps connected to a central vertical piece, the straps having holes at opposite ends and the central vertical portion welded to central structure 153. On each end of the top and bottom straps of the I-structure 185 is attached in pivotal fashion H-linkages 187 and 189 which extend outwardly to also engage in pivotal fashion horizontal metal structural pieces attached to the elongated side bars on the bottom, and the shields 181 and 183 on the top.

As can be seen from the perspective view of the embodiment of FIG. 10, the elongated side bars 161 and 163 are permitted to move out in a horizontal direction, and are urged outwards by means of the compression springs 171 and 173. Since the elongated side bars 161 and 163 are pivotable with fixed sized linkages connecting to central structure 153, i.e., side pieces 157 and 159 in the front and H-linkages 187 and 189 in the rear, the elongated side bars will move much like a flexible parallelogram with respect to each other. Since it is intended that as many plant stems as possible guide the progress of the elongated side bars 161 and 163, the relationship between the side bars 161 and 163 should be parallel lines and they are.

The spraying apparatus, not shown in FIG. 10, is attached to the H-linkages 187 and 189 aimed at the rear lower portion of the shield so as to miss striking the elongated side bars 161 and 163.

Referring now to FIG. 11, a rear view of the modified sled of FIG. 10 is detailed. Parts of the drawing which would be in the background of the rear view of FIG. 10 are left off for matters of clarity and simplicity. This refers specifically to the spring biasing control rods 165 and 167 and their associated apparatus, as well as the elongated side bars 161 and 163 movement towards the central area.

Shown in FIG. 11 at opposite sides are firstly the ends of elongated side bars 161 and 163 and at the top thereof, shields 181 and 183 connected thereto. H-linkages 187 and 189 are pivotally attached to horizontally extending metal pieces 182 and 184, attached respectively to side bar 161 and shield 181. The other end of H-linkages 187 and 189 are in turn attached to the centrally located I-structure 185 in pivotal fashion. Shown at the bottom of I-structure 185 is the attached end of central structure 153. As can be seen, there is a pivotal relationship on both ends of both H-linkages providing for independent movement of each side bar. The spraying apparatus spray nozzles 195 and 197 are shown attached to pipes attached to H-linkages 187 and 189, which pipes permit passage thereto of the vertical bolt about which horizontal pieces 182 and 184 pivot. These spray nozzles, as indicated earlier, are aimed to strike the ground immediately following the end of the elongated side bars 161 and 163, and under the shields 181 and 183.

Thus, as both the embodiments of FIGS. 7 through 11 move through the cultivated field, attached on opposite sides of the previously described apparatus for engaging the plant leaves of fixed-width rows, situated for the L-shaped bars 110 and 112 (FIGS. 7–9) or the elongated side bars 161 and 163 (FIGS. 10–11) to ride on the top of the rows of plants of the guess-row, urged by their respective spring biasing means against the stems of the plants, and guided thereby, the shields engage the lower leaves of the plant, raising them up and permitting the spraying the ground around and between the plant stems without the spray touching the plant leaves.

While preferred and alternate embodiments of Applicant's apparatus have been shown and described, it is appreciated that still other embodiments of the invention are possible and that there is no intent to limit the invention by such disclosure, but rather it is intended to cover all modifications and alternate embodiments falling within the spirit and the scope of the invention as defined by the appended claims.

I claim:

1. Self aligning sled apparatus for spraying a chemical mixture to the ground surface proximate plant stems in a crop row comprising:
   at least one sled adapted to be towed by a prime mover between two rows of crops, said sled defining a U-shaped bar adapted to ride on the ground surface between the crop rows and to be guided by engaging the plant stems in the crop rows on opposite sides;
   a pair of angled shields attached to said U-shaped bar and adapted to engage a crop row's plant foilage and lift it upwards as the sled is towed;
   a pair of parallel linkages attached between said sled U-shaped bar and prime mover permitting freedom of movement between said sled and the prime mover;
   a modified sled adapted to be towed adjacent said sled having said U-shaped bar, said modified sled including a L-shaped bar adapted to ride on the ground surface proximate a crop row;
   an angled shield attached to said L-shaped bar adapted to engage the crop row plant foilage and to raise the foilage as the sled is towed;
   a spring loaded arm pivotally connected to said L-shaped bar, said spring loaded arm arcuate shaped and adapted to engage the stems of the crop row plants in an adjacent crop row where by such engagement, said L-shaped arm is urged against the stems of the plants in the crop row between the adjacent sled having the U-shaped bar, and
   spraying apparatus attached to said angled shields of said U-shaped bar and said L-shaped bar, said spraying apparatus including spray nozzles oriented towards the ground proximate the crop row plant stems.

2. The self aligning sled apparatus as defined in claim 1 wherein said spraying apparatus attached to each of said pair of angled shields is so oriented that it sprays behind the end of the U-shaped bar and under each angled shield attached to each side of the U-shaped bar.

3. The self aligning sled apparatus as defined in claim 2 further including a plurality of sleds having said U-shaped bar arranged in a line behind the prime mover, said line formed by said plurality of sleds transverse to the row of crops.

4. The self aligning sled apparatus as defined in claim 3 wherein said modified sled comprises a pair of modified sleds arranged on opposite sides of the plurality of sleds having said U-shaped bars, said modified sleds also in line with said sleds having said U-shaped bar.

5. The self aligning sled apparatus as defined in claim 4 wherein said sleds having said U-shaped bar and said modified sleds arranged in said line transverse to the row of crops, are arranged such that alternate sleds precede the adjacent sled whereby if a rock is situated in or near the line made by the plant stems, the rock will be engaged by the convex outside surface of the leading sled U-shaped or L-shaped bar and be pushed aside into the path of the following sled in order that the following sled will further push the rock into a furrow formed between the plant rows.

6. Self aligning sled apparatus for spraying a chemical mixture to the ground surface proximate plant stems in a crop row comprising:
   at least one sled adapted to be towed by a prime mover between two rows of crops, said sled defining a U-shaped bar adapted to ride on the ground surface between the crop rows and to be guided by engaging the plant stems in the crop rows on opposite sides;
   a pair of angled shields attached to said U-shaped bar and adapted to engage a crop row's plant foliage and lift it upwards as the sled is towed;
   a modified sled adapted to be towed adjacent said sled having said U-shaped bar, said modified sled including a pair of L-shaped bars adapted to ride on the ground surface proximate the crop rows, said modified sled including at least one pivotal means operably attached to said L-shaped bars, said pivotal means adapted to allow said L-shaped bars to pivot one from another and thereby separate and to come together;
   angled shields attached to each of said L-shaped bars and adapted to engage the crop row plant foilage and to raise the foilage as the sled is towed; and
   spraying apparatus attached to said angled shields of said U-shaped bar sled and said modified sled L-shaped bars, said spraying apparatus including spray nozzles oriented towards the ground proximate the crop plant stems.

7. The self aligning sled apparatus as defined in claim 6 wherein said modified sled further includes:
   a second pivotal means operably attached to said L-shaped bars, said first and second pivotal means operably attached to each of said L-shaped bars adapted to permit the L-shaped bars to separate and come together while waiting elongated portions of said bars extending in the direction of travel remain parallel.

8. The self aligning sled apparatus as defined in claim 7 wherein said modified sled further includes:
   adjustable spring tensioning means operably attached to said L-shaped bars, said spring tensioning means adapted to pivotally urge said L-shaped bars apart and thus against the stems of the crop plants in the adjacent crop rows as the modified sled is towed.

9. The self aligning sled apparatus as defined in claim 8 wherein said modified sled further includes:
   a pair of parallel linkage means operably attaching at one end to said L-shaped bars, said parallel linkage means operably attached in a movable configuration to a cross pipe at its other end, said cross pipe operably attached to the prime mover whereby each of said L-shaped bars is allowed freedom to move horizontally and vertically.

10. The self aligning sled apparatus as defined in claim 9 wherein said angled shields attached to the elongated portion of said L-shaped bar extend along only a part of the elongated portion of said L-shaped bar and attach at the end of the elongated portion only.

11. Self aligning sled apparatus for spraying a chemical mixture to the ground surface proximate plant stems in a crop comprising:

at least one sled adapted to be towed by a prime mover between two rows of crops, said sled defining a U-shaped bar adapted to rid on the ground surface between the crop rows and to be guided by engaging the plant stems in the crop rows on opposite sides;

a pair of angled shields attached to said U-shaped bar and adapted to engage a crop row's plant foliage and lift it upwards as the sled is towed;

a modified sled adapted to be towed adjacent said sled apparatus having said U-shaped bar, said modified sled apparatus comprising:

a central elongated bar structure;

elongated side bars operably connected on both sides of said central elongated bar structure, said elongated side bars adapted to ride on the ground surface proximate the crop rows and to engage the stems of the plants of the crop rows and be guided thereby;

a pair of angled shields attached at one end to each of said elongated side bars, said angled shields rising upward and inward toward each other from said elongated side bars, said angled shields adapted to engage the crop plant foliage and raise the foliage; and spraying apparatus attached to at least one of said angled shields, said spraying apparatus receiving chemical for spraying the top surface of the crop row proximate the crop plant stems.

12. The self aligning sled apparatus as defined in claim 11 wherein said modified sled further includes:

pivotal means operably attached between said central elongated bar structure and each of said elongated side bars, said pivotal means comprising a first pivotal structural member pivotally attached at one end of said central elongated bar structure and at one end of each of said elongated side bars.

13. The self aligning sled apparatus as defined in claim 12 wherein said modified sled further includes:

a second pivotal structural member pivotally attaching said central elongated bar structure second end to the second end of each of said elongated side bars.

14. The self aligning sled apparatus as defined in claim 13 wherein said modified sled further includes:

adjustable spring biasing means operably attached between said central elongated bar structure and each of said elongated side bars.

15. The self aligning sled apparatus as defined in claim 14 wherein said modified sled second pivotal structural member defines a joinder plate fixedly attached to said central elongated bar structure and to each of said elongated side bars wherein each of said side bars are permitted to pivot with respect to said elongated central structural member.

16. The self aligning sled apparatus as defined in claim 15 wherein said modified sled further includes connecting parallel linkages operably connected at one end to said elongated central bar structure, and at the other end to said prime mover whereby as the prime mover pulls the modified sled apparatus through the fields to spray the ground proximate the crops in the row, the parallel linkages provide freedom of movement to the modified sled.

* * * * *